United States Patent
Kwon et al.

(10) Patent No.: US 8,098,596 B2
(45) Date of Patent: Jan. 17, 2012

(54) METHOD AND APPARATUS FOR CONFIGURING CHANNEL NODE TREE IN AN OFDMA WIRELESS COMMUNICATION SYSTEM

(75) Inventors: Hwan-Joon Kwon, Hwaseong-si (KR);
Jae-Chon Yu, Suwon-si (KR);
Dong-Hee Kim, Yongin-si (KR);
Jae-Hyun Park, Suwon-si (KR);
Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 931 days.

(21) Appl. No.: 11/923,312

(22) Filed: Oct. 24, 2007

(65) Prior Publication Data
US 2008/0095074 A1  Apr. 24, 2008

(30) Foreign Application Priority Data
Oct. 24, 2006 (KR) .................... 10-2006-0103721

(51) Int. Cl.
*H04L 12/28* (2006.01)
(52) U.S. Cl. ........................ 370/255; 370/329

(58) Field of Classification Search .............. None
See application file for complete search history.

(56) References Cited

U.S. PATENT DOCUMENTS

| | | | |
|---|---|---|---|
| 6,804,528 B1 | 10/2004 | Laroia et al. | |
| 7,042,858 B1 * | 5/2006 | Ma et al. | 370/331 |
| 2002/0085641 A1 * | 7/2002 | Baum | 375/260 |
| 2005/0135324 A1 * | 6/2005 | Kim et al. | 370/343 |

FOREIGN PATENT DOCUMENTS

| | | |
|---|---|---|
| KR | 1020050014695 | 2/2005 |
| KR | 1020050089699 | 9/2005 |
| KR | 1020060037119 | 5/2006 |

* cited by examiner

*Primary Examiner* — Chirag Shah
*Assistant Examiner* — Minh-Trang Nguyen
(74) *Attorney, Agent, or Firm* — The Farrell Law Firm, P.C.

(57) ABSTRACT

A method and apparatus for configuring a channel node tree in an OFDMA wireless communication system are provided, in which as many DRCH nodes as the number of DRCHs used for a frame are configured at base nodes, as many BRCHs as the number of DRCHs are selected from among BRCHs used for the frame, BRCH nodes with unselected BRCHs are configured at base nodes, and upper nodes are configured using the base nodes corresponding to the DRCH nodes and the BRCH nodes.

10 Claims, 11 Drawing Sheets

METHOD AND APPARATUS FOR CONFIGURING CHANNEL NODE TREE IN AN OFDMA WIRELESS COMMUNICATION SYSTEM

PRIORITY

This application claims priority under 35 U.S.C. §119(a) to a Korean Patent Application filed in the Korean Intellectual Property Office on Oct. 24, 2006 and assigned Serial No. 2006-103721, the contents of which are incorporated herein by reference.

BACKGROUND OF THE INVENTION

1. Field of the Invention

The present invention relates generally to a wireless communication system, and in particular, to a method and apparatus for configuring a channel node tree to allocate resources in an Orthogonal Frequency Division Multiple Access (OFDMA) wireless communication system.

2. Description of the Related Art

Orthogonal Frequency Division Multiplexing (OFDM) has recently been actively studied and utilized for wireless communication systems. OFDM is a special type of multi-carrier modulation, in which a serial symbol sequence is converted to parallel symbol sequences and modulated to a plurality of orthogonal subcarriers, that is, subcarrier channels, prior to transmission.

Figure 1:
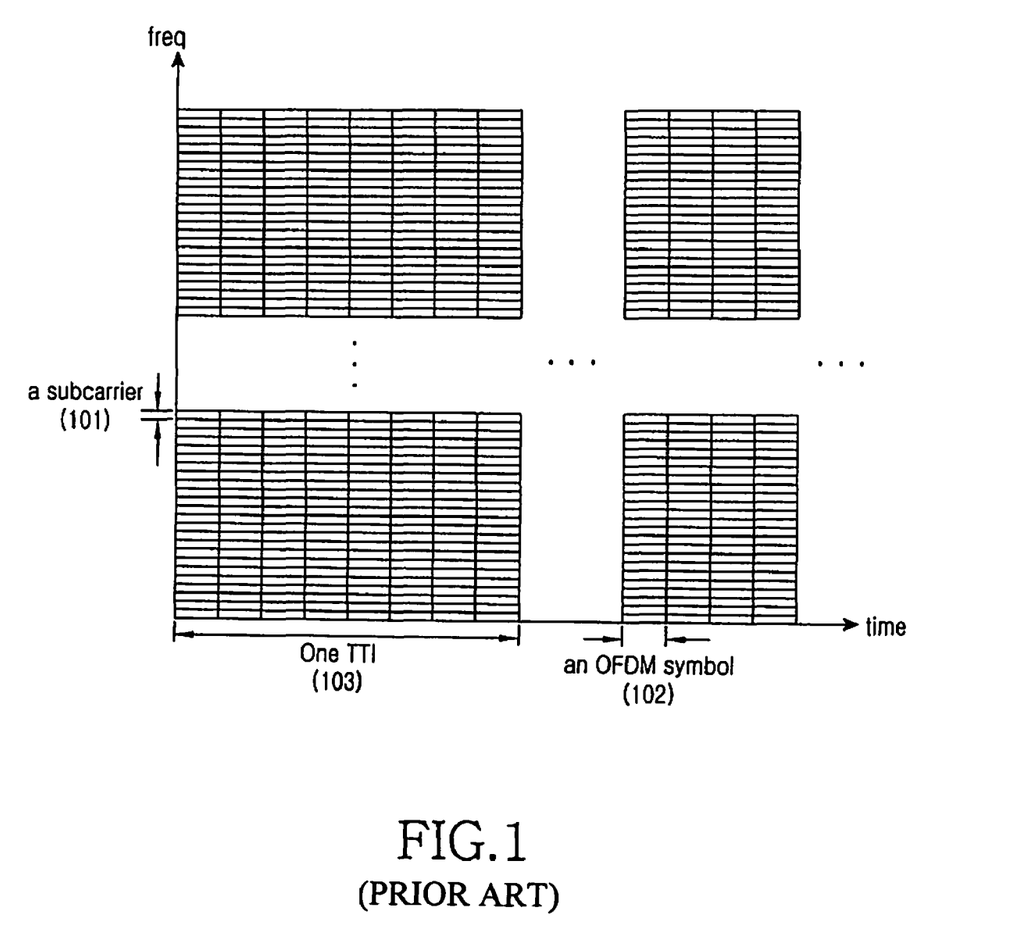
FIG. 1 illustrates conventional time-frequency resources in an OFDMA wireless communication system.

FIG. 1 illustrates time-frequency resources in a conventional OFDM wireless communication system.

The OFDM system typically transmits one modulation symbol such as a Quadrature Phase Shift Keying (QPSK) or 16-ary Quadrature Amplitude Modulation (16QAM) symbol on one subcarrier. Thus, subcarriers are basic resources.

Referring to FIG. 1, the horizontal axis represents time and the vertical axis represents frequency. Reference numeral 101 denotes a subcarrier and reference numeral 102 denotes an OFDM symbol.

In general, one OFDM symbol includes a plurality of subcarriers. It is assumed herein that the subcarriers illustrated in FIG. 1 are those that carry actual data, without guard subcarriers. As denoted by reference numeral 103, a plurality of OFDM symbols form a basic packet data transmission unit called a "frame". As illustrated in FIG. 1, one frame includes a plurality of OFDM symbols, each having a plurality of subcarriers. One rectangle represents a subcarrier in an OFDM symbol, referred to as "time-frequency resources".

Typically, one frame includes a plurality of physical channels. For example, the time-frequency resources of one frame are used for a Paging CHannel (PCH), a Common Control CHannel (CCCH) for carrying system information, a Packet Data CHannel (PDCH) for transmitting user data and a Packet Data Control CHannel (PDCCH) for transmitting control information necessary for demodulation of the PDCH. There may also exist other physical channels that serve other purposes.

Since the OFDM wireless communication system has two-dimensional resources, i.e. time-frequency resources and uses a plurality of physical channels with different resource requirements, subcarriers should be efficiently allocated to each physical channel and indicated between a transmitter and a receiver. For this purpose, the OFDM wireless communication system defines a basic resource allocation unit, allocates resources to each physical channel in basic resource allocation units, and indicates the positions of the resources between the transmitter and the receiver by an indicator for the resource allocation units. Hereinbelow, the basic resource allocation unit is referred to as a "resource channel".

The two resource channels in an OFDMA system are a Distributed Resource CHannel (DRCH) and a Block Resource CHannel (BRCH).

The DRCH includes subcarriers distributed in time and frequency, and the BRCH includes successive subcarriers.

The DRCH is used to maximize diversity gain, whereas the BRCH is used to maximize channel selective resource scheduling gain.

Figure 2:
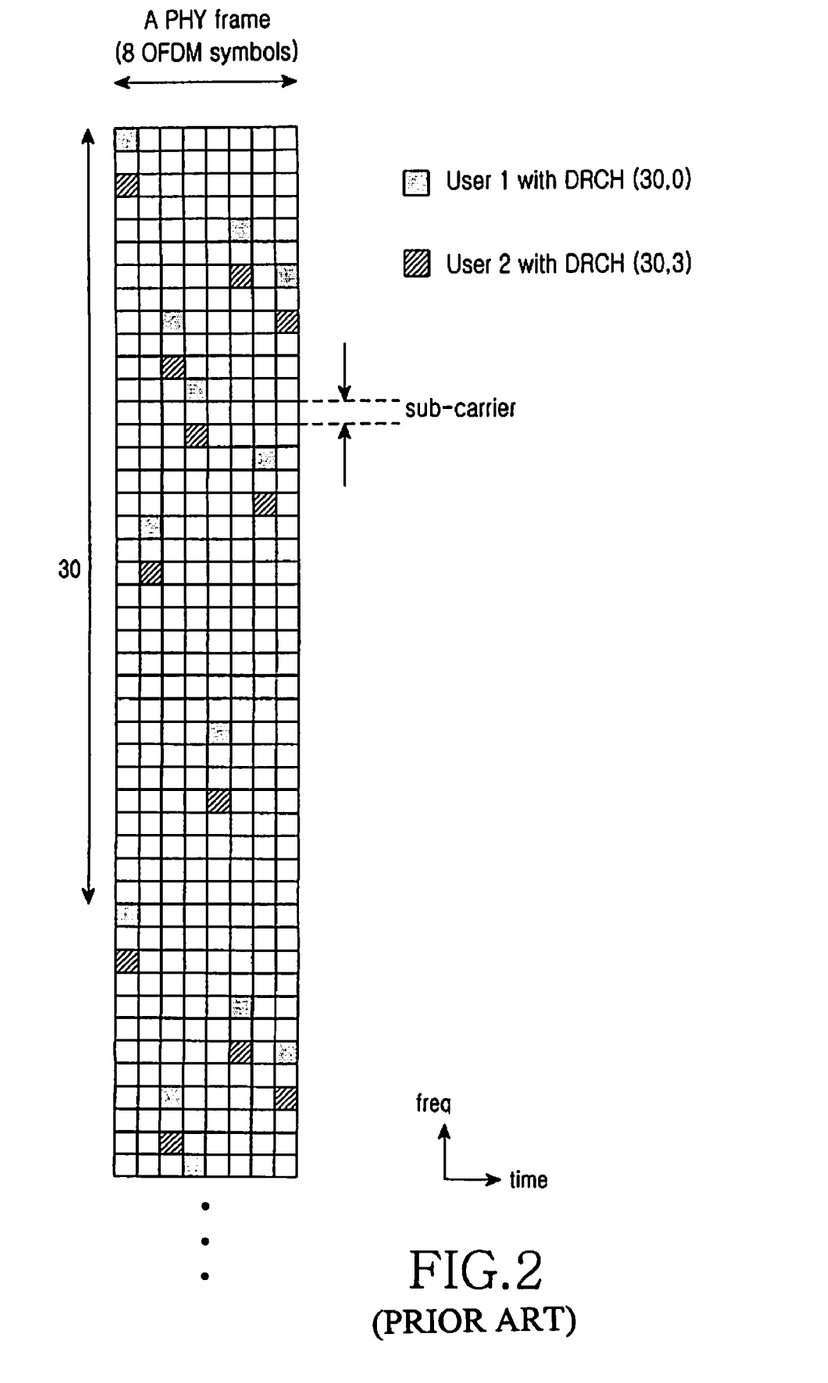
FIG. 2 illustrates a conventional configuration of a DRCH.

FIG. 2 illustrates a conventional configuration of the DRCH.

Referring to FIG. 2, DRCH (D, k) represents a $k^{th}$ resource channel among D resource channels formed from total subcarriers available to one OFDM symbol. As illustrated in FIG. 2, a DRCH has scattered resources, which suits diversity transmission. In an OFDMA system, different resource channels are allocated to users by DRCH (D, k) indicators.

Figure 3:
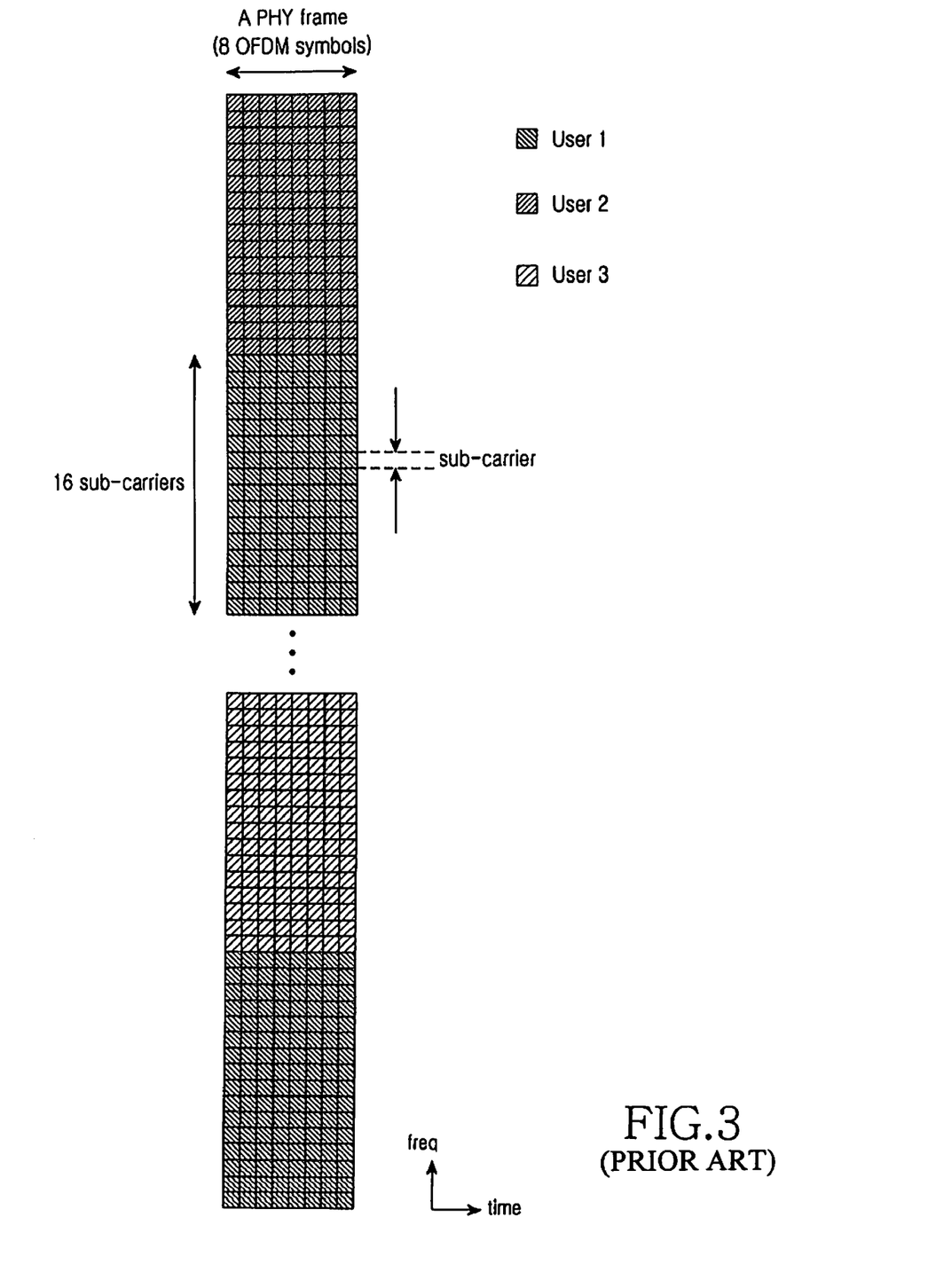
FIG. 3 illustrates a conventional configuration of a BRCH.

FIG. 3 illustrates a conventional configuration of the BRCH.

Referring to FIG. 3, one BRCH includes 16 successive subcarriers and 8 successive OFDM symbols, thus a total of 128 time-frequency resources. This BRCH is a basic resource allocation unit.

Like the DRCH, BRCH (B, k) represents a $k^{th}$ resource channel among B resource channels formed from total subcarriers available to one OFDM symbol.

Figure 4:
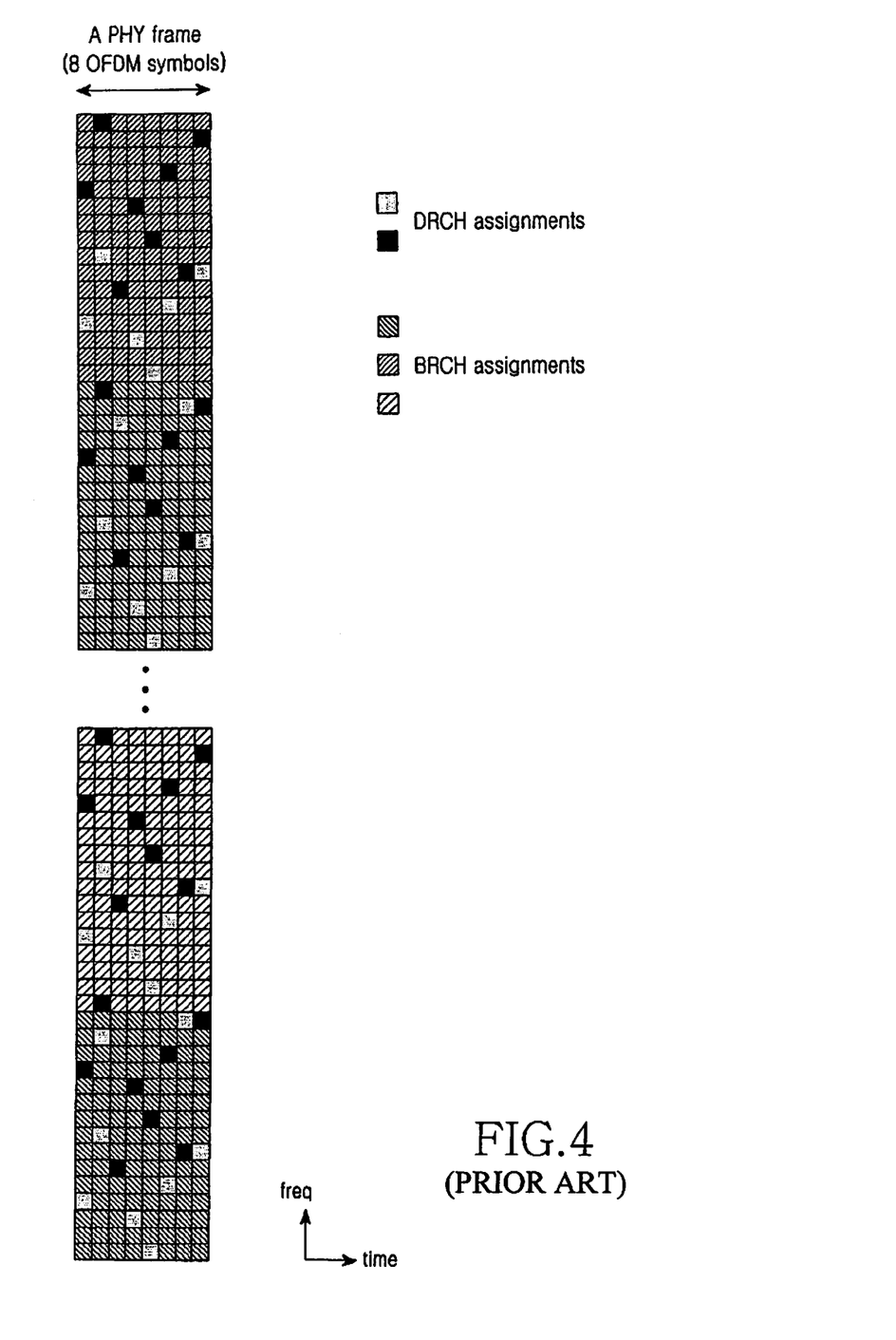
FIG. 4 is a conventional resource allocation for multiplexing a DRCH with a BRCH in one frame.

FIG. 4 illustrates a conventional resource allocation for multiplexing a DRCH with a BRCH in one frame.

Referring to FIG. 4, DRCHs are multiplexed with BRCHs. When a DRCH overlaps with a BRCH, the DRCH punctures a portion of the BRCH. This multiplexing method is useful in achieving both diversity gain and channel selective scheduling gain from one frame.

Meanwhile, DRCHs and BRCHs are allocated by configuring a channel node tree and allocating one node of the channel node tree.

Figure 5:
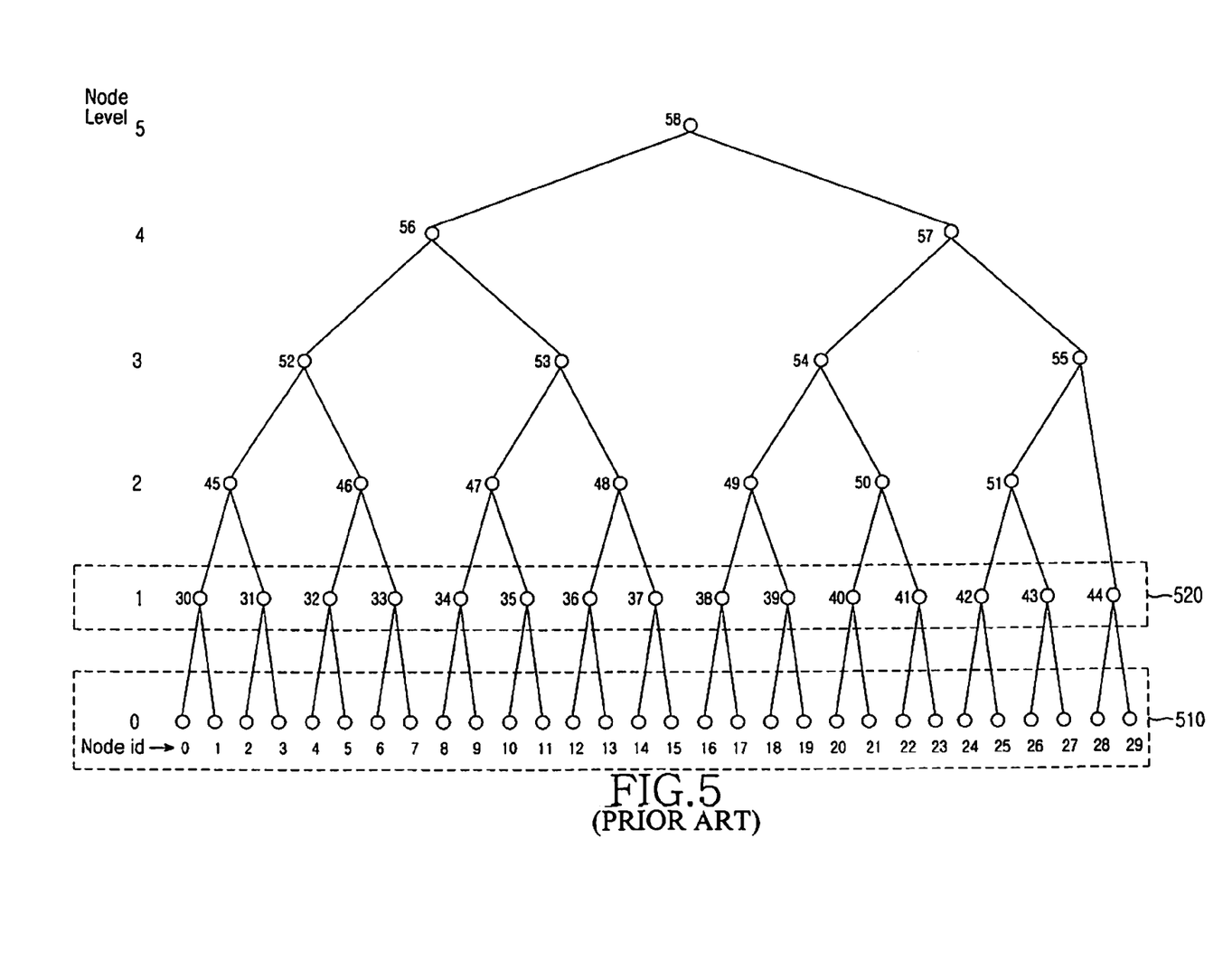
FIG. 5 illustrates a conventional channel node tree.

FIG. 5 illustrates a conventional channel node tree.

Referring to FIG. 5, the lowest nodes are called base nodes 510 and every pair of base nodes are connected to a second-level node 520. As illustrated in FIG. 5, the base nodes 510 and the second-level nodes 520 are at different node levels. In this context, there are six node levels for the channel node tree.

The channel node tree has 30 base nodes 510, which indicates that D is 30 for DRCH (D, k) and B is 30 for BRCH (B, k). That is, DRCH (30, 0) to DRCH (30, 29) are mapped to the base nodes 510 and DRCH resources are allocated by allocating one node of the channel node tree. BRCH resources are allocated in the same manner.

If a DRCH is multiplexed with a BRCH as illustrated in FIG. 4, a DRCH channel node tree and a BRCH channel node tree are configured separately. When resources are allocated, one node of each channel node tree is allocated along with a node ID identifying a DRCH or a BRCH. A user to which BRCH resources are allocated can use the remaining BRCH resources except BRCH resources overlapped with DRCH resources in a frame.

Because two channel node trees are configured for DRCH and BRCH allocations, a problem occurs in that more signaling bits are used to indicate the DRCH and the BRCH allocations and more resources are required to transmit uplink ACKnowledgement/Negative ACKnowledgement (ACK/NACK) for downlink Hybrid Automatic Repeat reQuest (HARQ).

SUMMARY OF THE INVENTION

An aspect of the present invention is to address at least the problems and/or disadvantages and to provide at least the advantages described below. Accordingly, an aspect of the present invention is to provide a method and apparatus for configuring a channel node tree to efficiently allocate a DRCH and a BRCH in an OFDMA wireless communication system.

An aspect of the present invention provides a method and apparatus for configuring a channel node tree in order to configure a physical channel with less resource allocation indication overload, when a DRCH is multiplexed with a BRCH in a frame in an OFDMA wireless communication system.

An aspect of the present invention provides a method and apparatus for configuring a channel node tree in order to reduce required uplink ACK/NACK resources when a DRCH is multiplexed with a BRCH in a frame in an OFDMA wireless communication system.

In accordance with the present invention, there is provided a method for configuring a channel node tree in an OFDMA wireless communication system, in which as many DRCH nodes as the number of DRCHs used for a frame are configured at base nodes, as many BRCHs as the number of DRCHs are selected from among BRCHs used for the frame, BRCH nodes with the number of unselected BRCHs are configured at base nodes, and upper nodes are configured using the base nodes corresponding to the DRCH nodes and the BRCH nodes.

In accordance with the present invention, there is provided a method for configuring a channel node tree in an OFDMA wireless communication system, in which as many DRCH nodes as the number of DRCHs used for a frame are configured at base nodes, as many BRCHs as the number of DRCHs are selected from among BRCHs used for the frame, BRCH nodes are configured at base nodes by mapping the BRCHs used for the frame to unselected BRCHs, and upper nodes are configured using the base nodes corresponding to the DRCH nodes and the BRCH nodes.

In accordance with the present invention, there is provided an apparatus for configuring a channel node tree in an OFDMA wireless communication system, in which a channel encoder and rate matcher channel-encodes transmission data and rate-matches channel-encoded data, a modulator modulates rate-matched data received from the channel encoder and rate matcher in a modulation scheme, a subcarrier mapper maps modulation symbols received from the modulator to subcarriers in a rule, an OFDM signal generator generates an OFDM symbol using the mapped modulation symbols, and a controller configures as many DRCH nodes as the number of DRCHs used for a frame at base nodes, selects as many BRCHs as the number of DRCHs from among BRCHs used for the frame, configures BRCH nodes with the number of unselected BRCHs at base nodes, and configures upper nodes using the base nodes corresponding to the DRCH nodes and the BRCH nodes, during the subcarrier mapping.

In accordance with the present invention, there is provided an apparatus for configuring a channel node tree in an OFDMA wireless communication system, in which a channel encoder and rate matcher channel-encodes transmission data and rate-matches channel-encoded data, a modulator modulates rate-matched data received from the channel encoder and rate matcher in a modulation scheme, a subcarrier mapper maps modulation symbols received from the modulator to subcarriers in a rule, an OFDM signal generator generates an OFDM symbol using the mapped modulation symbols, and a controller configures as many DRCH nodes as the number of DRCHs used for a frame at base nodes, selects as many BRCHs as the number of DRCHs from among BRCHs used for the frame, configures BRCH nodes at base nodes by mapping the BRCHs used for the frame to unselected BRCHs, and configures upper nodes using the base nodes corresponding to the DRCH nodes and the BRCH nodes.

In accordance with the present invention, there is provided a method for receiving a channel node tree in an OFDMA wireless communication system, in which an OFDM signal is received from a transmitter, modulation symbols are extracted from the OFDM signal and converted to code symbols and the code symbols are de-rate_matched and channel-decoded. During the extraction of the modulation symbols, base nodes including DRCH nodes and BRCH nodes are extracted, the DRCH nodes being configured at base nodes for as many DRCHs used for a frame, and the BRCH nodes being configured with the number of unselected BRCHs at base nodes, resulting from selecting as many BRCHs as the number of DRCHs from among BRCHs used for the frame.

In accordance with the present invention, there is provided a method for receiving a channel node tree in an OFDMA wireless communication system, in which an OFDM signal is received from a transmitter, modulation symbols are extracted from the OFDM signal and converted to code symbols and the code symbols are de-rate matched and channel-decoded. During the extraction of the modulation symbols, base nodes including DRCH nodes and BRCH nodes are extracted, the DRCH nodes being configured at base nodes for as many DRCHs used for a frame, and the BRCH nodes being configured by selecting as many BRCHs as the number of DRCHs from among BRCHs used for the frame and mapping the BRCHs used for the frame to unselected BRCHs.

In accordance with the present invention, there is provided an apparatus for receiving a channel node tree in an OFDMA wireless communication system, in which an OFDM receiver receives an OFDM signal from a transmitter, a subcarrier demapper extracts modulation symbols from the OFDM signal, a demodulator converts the modulation symbols to code symbols, a de-rate matcher and channel decoder de-rate matches the code symbols and channel-decodes the de-rate matched symbols, and a controller extracts base nodes including DRCH nodes and BRCH nodes during the extraction of the modulation symbols, the DRCH nodes being configured at base nodes for as many DRCHs used for a frame, and the BRCH nodes being configured with the number of unselected BRCHs at base nodes, resulting from selecting as many BRCHs as the number of DRCHs from among BRCHs used for the frame.

In accordance with the present invention, there is provided an apparatus for receiving a channel node tree in an OFDMA wireless communication system, in which an OFDM receiver receives an OFDM signal from a transmitter, a subcarrier demapper extracts modulation symbols from the OFDM signal, a demodulator converts the modulation symbols to code symbols, a de-rate matcher and channel decoder de-rate matches the code symbols and channel-decodes the de-rate matched symbols, and a controller extracts base nodes including DRCH nodes and BRCH nodes during the extraction of the modulation symbols, the DRCH nodes being configured at base nodes for as many DRCHs used for a frame, and the BRCH nodes being configured by selecting as many BRCHs as the number of DRCHs from among BRCHs used for the frame and mapping the BRCHs used for the frame to unselected BRCHs.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description such as a detailed construction and elements are provided to assist in a comprehensive understanding of the preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Figure 6:
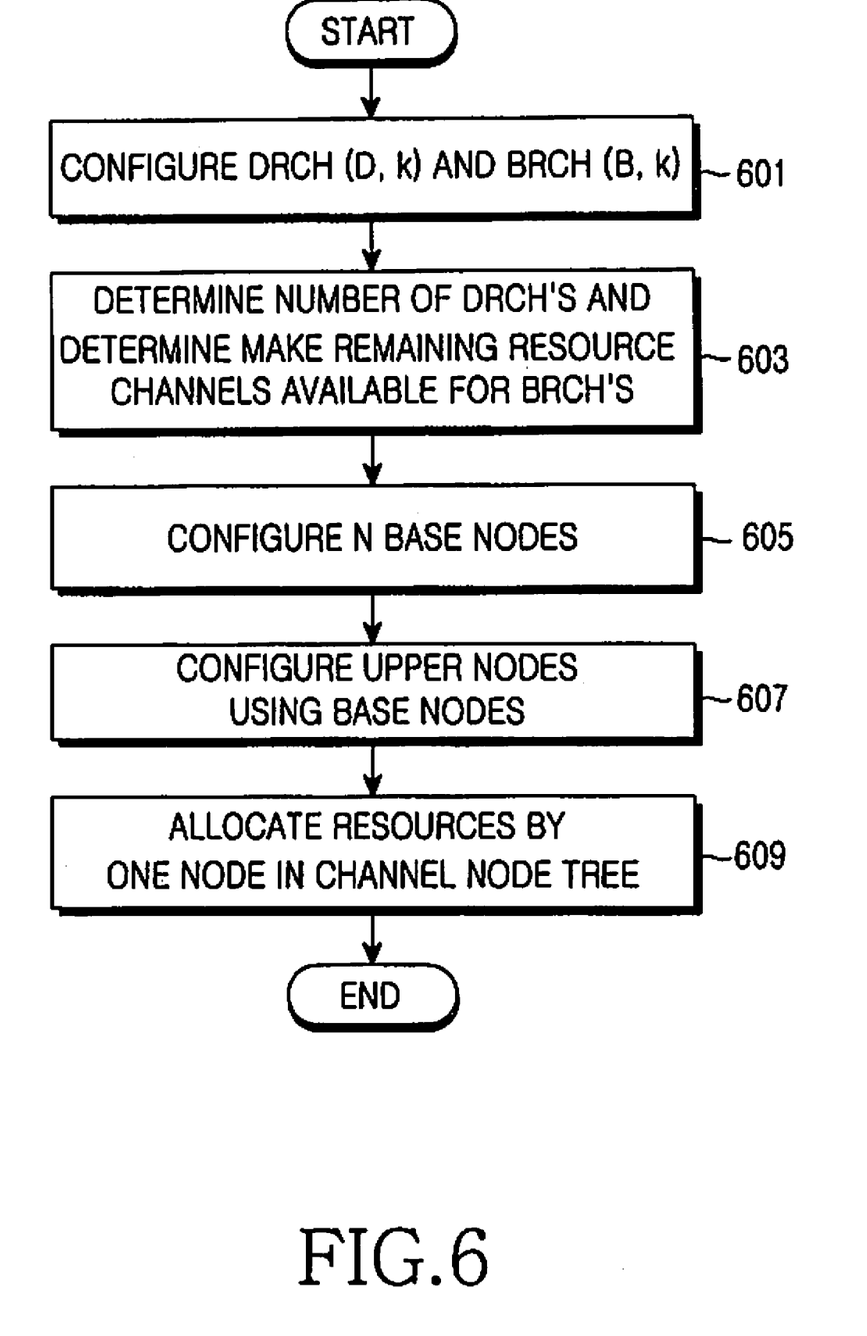
FIG. 6 is a flowchart of a channel node tree configuration method in an OFDM wireless communication system according to the present invention.

FIG. 6 illustrates a channel node tree configuration method in an OFDMA wireless communication system according to the present invention.

Referring to FIG. 6, a Base Station (BS) configures D DRCHs, DRCH (D, k) and B BRCHs, BRCH (B, k) in step 601. In step 603, the BS determines the number of actually used DRCHs in every frame, P and the number of resources available for the BRCHs in every frame, N−P. P is set for every frame or for every set number of frames.

Figure 7:
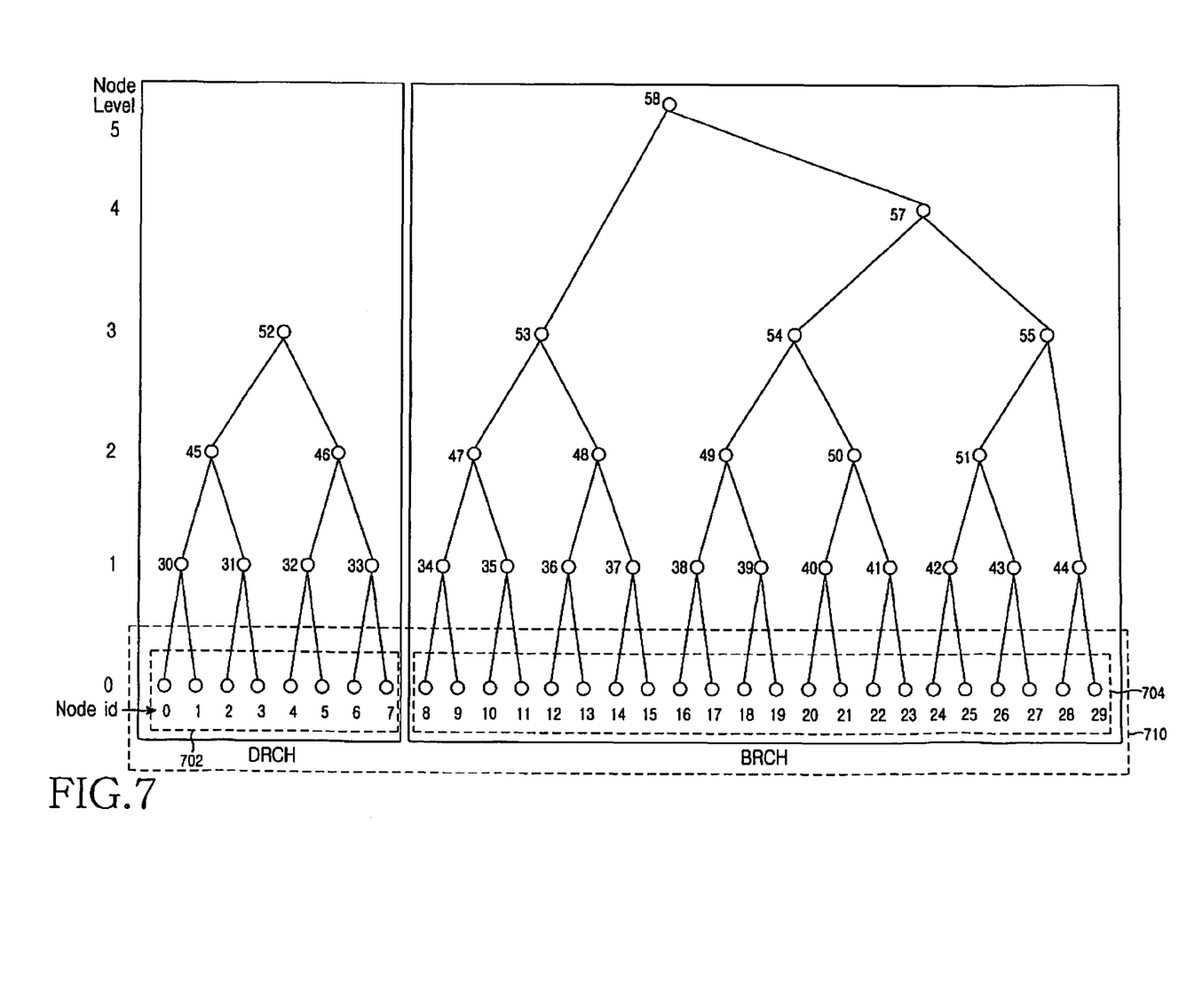
FIG. 7 illustrates a channel node tree configured according to the present invention.

Referring to FIGS. 6 and 7, in step 605, the BS configures N base nodes 710 using the P DRCHs and the B−(N−P) BRCHs. The N base nodes 710 are indexed from 0 to N−1 and the P DRCHs are mapped to P base nodes in an ascending order of indexes, herein. Alternatively, the mapping can be performed in a descending order of indexes.

After the P DRCHs are mapped to base nodes 702, base node #0 to #(P−1), the BRCHs are mapped to the remaining (N−P) base nodes 704 by selecting B−(N−P) BRCHs. The B−(N−P) BRCHs selection can be performed uniformly. The selected B−(N−P) BRCHs can be expressed by Equation (1) as $$\left\lceil \frac{B}{B-(N-P)} \cdot l \right\rceil, l = 0, \ldots, B-(N-P)-1 \quad (1)$$

where B denotes the number of BRCHs, P denotes the number of DRCHs actually used for every frame, N denotes the number of base nodes, and $\lceil x \rceil$ denotes the minimum integer equal to or greater than x. The selected BRCHs are determined by dividing the number of the BRCHs used for the frame by the number of the selected BRCHs, multiplying a result from the division respectively by 0 and integers less than the number of the selected BRCHs, and selecting minimum integers equal to or greater than integers from the results of the multiplication. There can be other methods in addition to Equation (1) for uniformly selecting the B−(N−P) BRCHs among the B BRCHs. Each of the selected BRCHs is bound to its adjacent unselected BRCH that can be adjacent to the selected BRCH upward or downward. For example, if BRCH (B, x) is selected and BRCH (B, x+1) remains unselected, BRCH (B, x) is also allocated, when BRCH (B, x+1) is allocated. If BRCH (B, x+1) is selected and BRCH (B, x) remains unselected, BRCH (B, x+1) can be absorbed into BRCH (B, x) so that BRCH (B, x+1) is also allocated when BRCH (B, x) is allocated. The following description is made under the assumption that a selected BRCH is bound to a BRCH with the highest resource channel index among the remaining BRCHs.

The following example is provided for better understanding of the above operation.

If D=30, B=30, P=8 and N=30, that is, if 30 DRCHs, i.e. DRCH (D, k) (k is 0 to 29) and 30 BRCHs, i.e. BRCH (B, k) (k is 0 to 29) are defined and eight (P=8) DRCHs, DRCH (30, 0) to DRCH (30, 7) are used for a given frame in step 601, BRCH resource channels corresponding to DRCH (30, 0) to DRCH (30, 7) are selected, BRCH (30, k) (k is 0 to 29) in step 603. The BS configures 30 base nodes in a channel node tree in step 605. The 30 base nodes include both the DRCHs and BRCHs. For this purpose, DRCH (30, 0) to DRCH (30, 7) are mapped to base node 0 to base node 7. Then, 22 (N−P=30−8) BRCHs remaining after 8 (=B−(N−P)) BRCHs are uniformly selected by Equation (1) are mapped to 22 base nodes 704. According to Equation (1), the selected BRCHs are BRCH (30, 0), BRCH (30, 4), BRCH (30, 8), BRCH (30, 12), BRCH (30, 15), BRCH (30, 19), BRCH (30, 23), and BRCH (30, 27), as listed in Table 1. The selected BRCHs are each bound to their upward neighbors, BRCH (30, 1), BRCH (30, 5), BRCH (30, 9), BRCH (30, 13), BRCH (30, 16), BRCH (30, 20), BRCH (30, 24), and BRCH (30, 28).

The resource channels that are mapped to the 30 base nodes are listed in Table 1, which illustrates a configuration of base nodes in a single channel node tree according to an exemplary embodiment of the present invention.

TABLE 1

| Base node index | Resource channels mapped to base nodes |
| --- | --- |
| 0 | DRCH (30, 0) |
| 1 | DRCH (30, 1) |
| 2 | DRCH (30, 2) |
| 3 | DRCH (30, 3) |
| 4 | DRCH (30, 4) |
| 5 | DRCH (30, 5) |
| 6 | DRCH (30, 6) |
| 7 | DRCH (30, 7) |
| 8 | BRCH (30, 0), BRCH (30, 1) |
| 9 | BRCH (30, 2) |
| 10 | BRCH (30, 3) |
| 11 | BRCH (30, 4), BRCH (30, 5) |
| 12 | BRCH (30, 6) |
| 13 | BRCH (30, 7) |
| 14 | BRCH (30, 8), BRCH (30, 9) |
| 15 | BRCH (30, 10) |
| 16 | BRCH (30, 11) |

TABLE 1-continued

| Base node index | Resource channels mapped to base nodes |
| --- | --- |
| 17 | BRCH (30, 12), BRCH (30, 13) |
| 18 | BRCH (30, 14) |
| 19 | BRCH (30, 15), BRCH (30, 16) |
| 20 | BRCH (30, 17) |
| 21 | BRCH (30, 18) |
| 22 | BRCH (30, 19), BRCH (30, 20) |
| 23 | BRCH (30, 21) |
| 24 | BRCH (30, 22) |
| 25 | BRCH (30, 23), BRCH (30, 24) |
| 26 | BRCH (30, 25) |
| 27 | BRCH (30, 26) |
| 28 | BRCH (30, 27), BRCH (30, 28) |
| 29 | BRCH (30, 29) |

In step 607, upper nodes are configured using the base nodes without any crossing connection between DRCHs and BRCHs. Step 609 will be described below with reference to FIG. 7.

FIG. 7 illustrates a channel node tree configured according to the present invention.

Referring to FIG. 7, 30 base nodes are configured as illustrated in Table 1. DRCH upper nodes are configured using 8 DRCH base nodes 702 and BRCH upper nodes are configured using 22 BRCH base nodes 704.

In step 609, the BS allocates resources by allocating one node in the channel node tree to a Mobile Station (MS) and signals the value of the allocated node to the MS. Then, the MS identifies the allocated resources by the node value.

Figure 8:
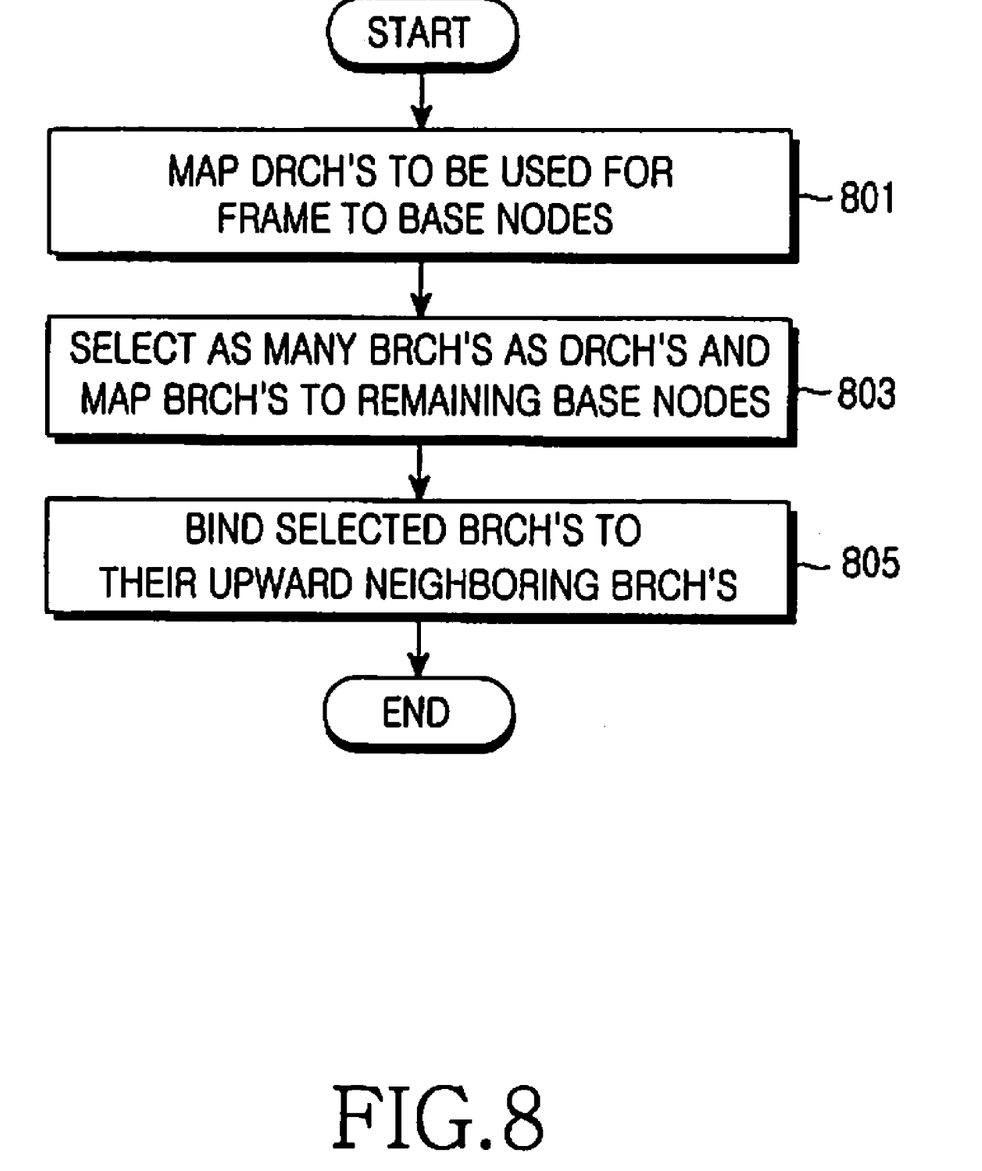
FIG. 8 illustrates a base node configuring method according to the present invention.

FIG. 8 illustrates a base node configuring method according to the present invention. Step 605 of FIG. 6 is described in detail in FIG. 8.

Referring to FIG. 8, the BS maps DRCHs to be used for a given frame to as many base nodes in step 801 and maps BRCHs to the remaining base nodes in step 803. Here, the BS selects as many BRCHs as the DRCHs mapped to the base nodes from among BRCHs to be used for the given frame so that the BRCHs can be mapped to the remaining base nodes.

In step 805, the BS binds each of the selected BRCHs to its upward adjacent BRCH, for indexing during resource allocation.

Figure 9:
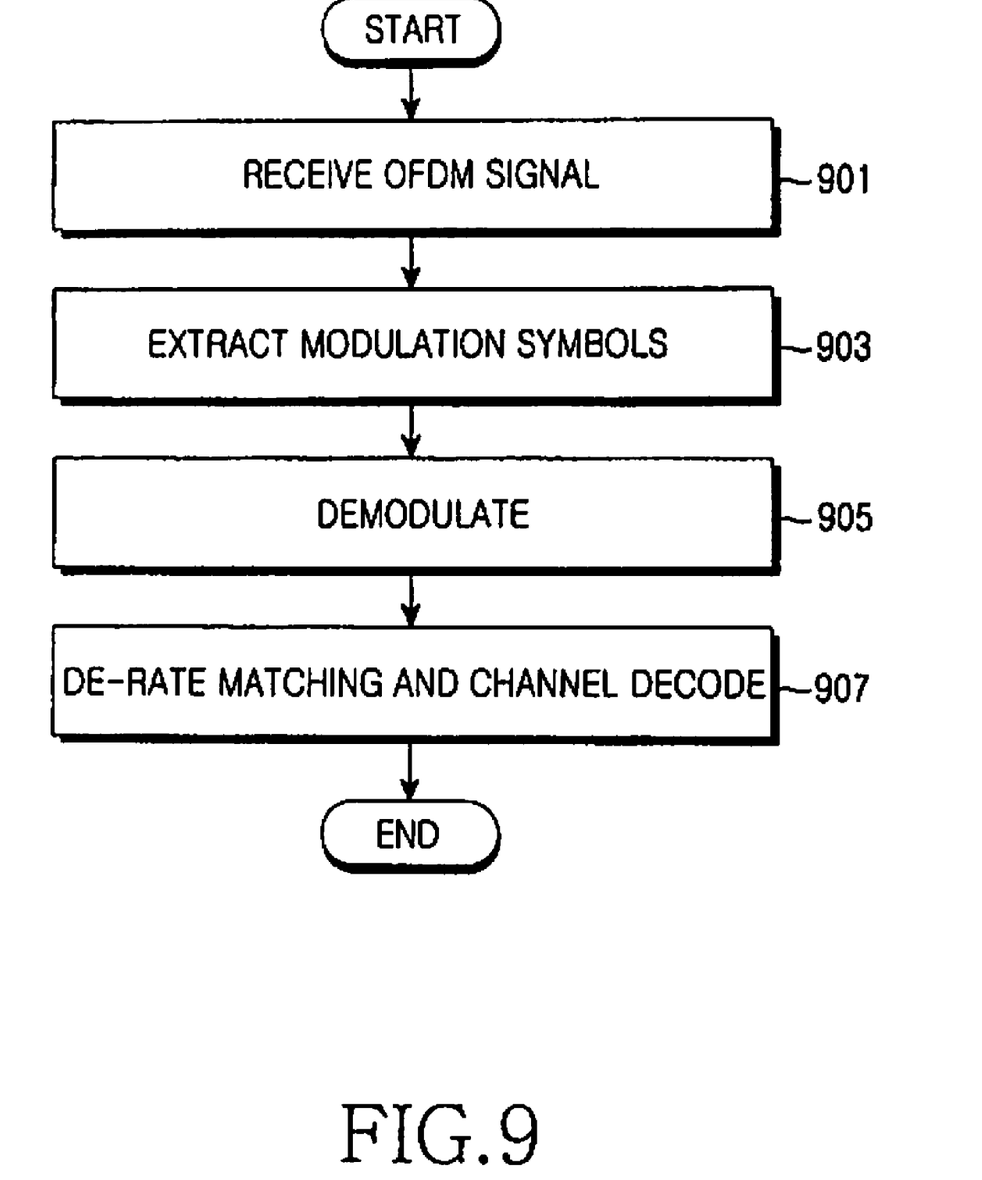
FIG. 9 illustrates a reception operation according to the present invention.

FIG. 9 illustrates a reception operation according to the present invention.

Referring to FIG. 9, a receiver receives an OFDM signal from a transmitter in step 901 and extracts modulation symbols from the OFDM signal by applying input parameters to Equation (1) in step 903. The input parameters are B, P and D. In step 905, the receiver converts the modulation symbols to code symbols. Then, the receiver recovers data by subjecting the code symbols to a de-rate matching and channel decoding in step 907.

Figure 10:
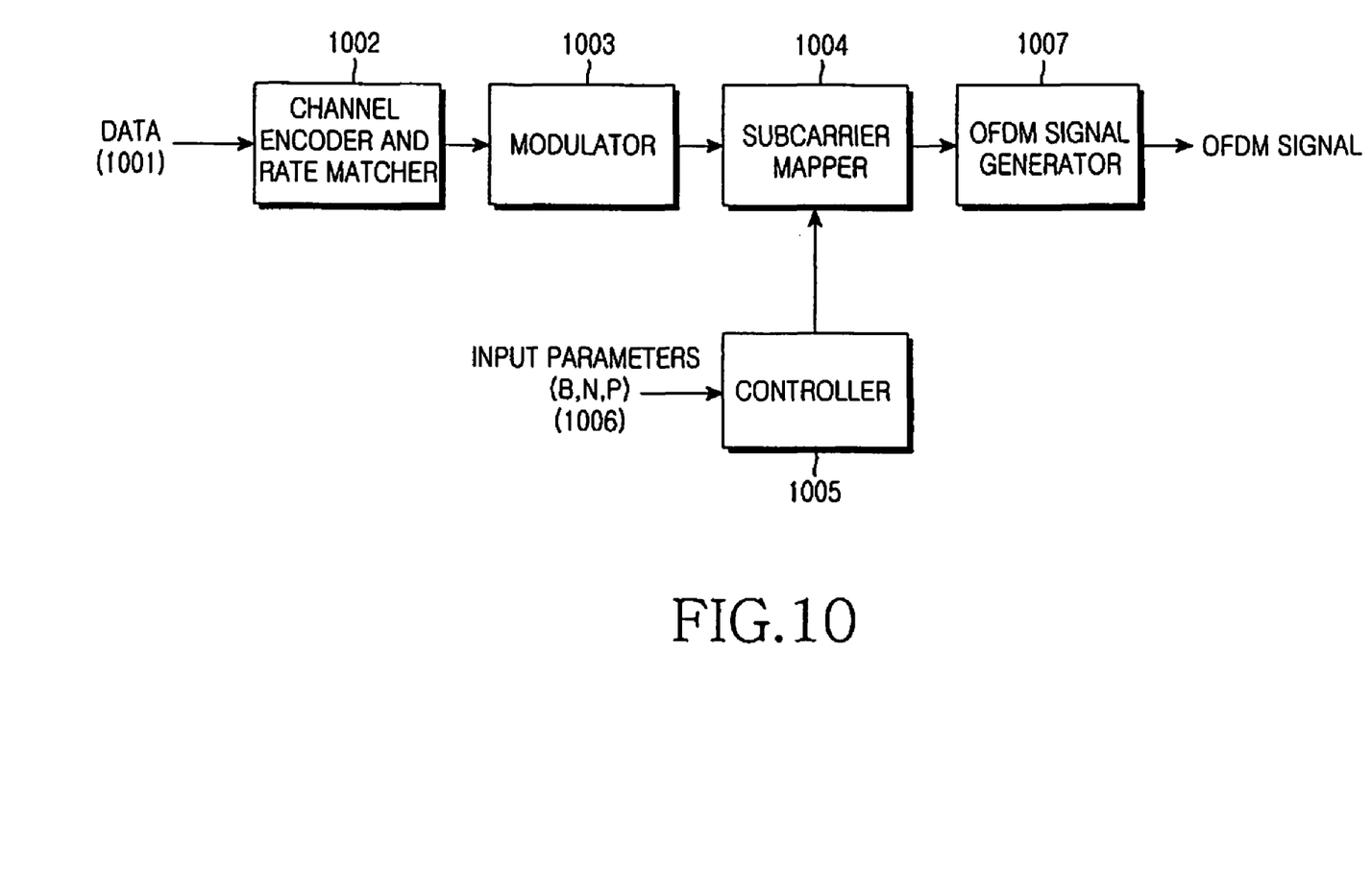
FIG. 10 illustrates a transmitter according to an exemplary embodiment of the present invention.

FIG. 10 illustrates a transmitter according to the present invention.

Referring to FIG. 10, a channel decoder and rate matcher 1002 processes an input data stream 1001 by channel encoding such as turbo encoding or Low Density Parity Check (LDPC) coding, and rate matching. The rate matching is the process of achieving a system-set number of code symbols. Since rate matching is performed for data transmission in a conventional mobile communication system, its detailed description is not provided herein. A modulator 1003 modulates the code symbols by a technique such as QPSK or 16QAM. A subcarrier mapper 1004 maps the modulation symbols to subcarriers in a rule.

Meanwhile, a controller 1004 controls the operation of the subcarrier mapper 1004 in the method illustrated in FIGS. 6, 7 and 8. Therefore, the controller 1005 receives B, P and D for computing Equation (1). A conventional OFDM signal generator 1007 generates an OFDM signal using the mapped modulation symbols. The OFDM signal generator 1007 generally includes a Fast Fourier Transform (FFT) processor (not shown) and a Cyclic Prefix (CP) adder (not shown).

Figure 11:
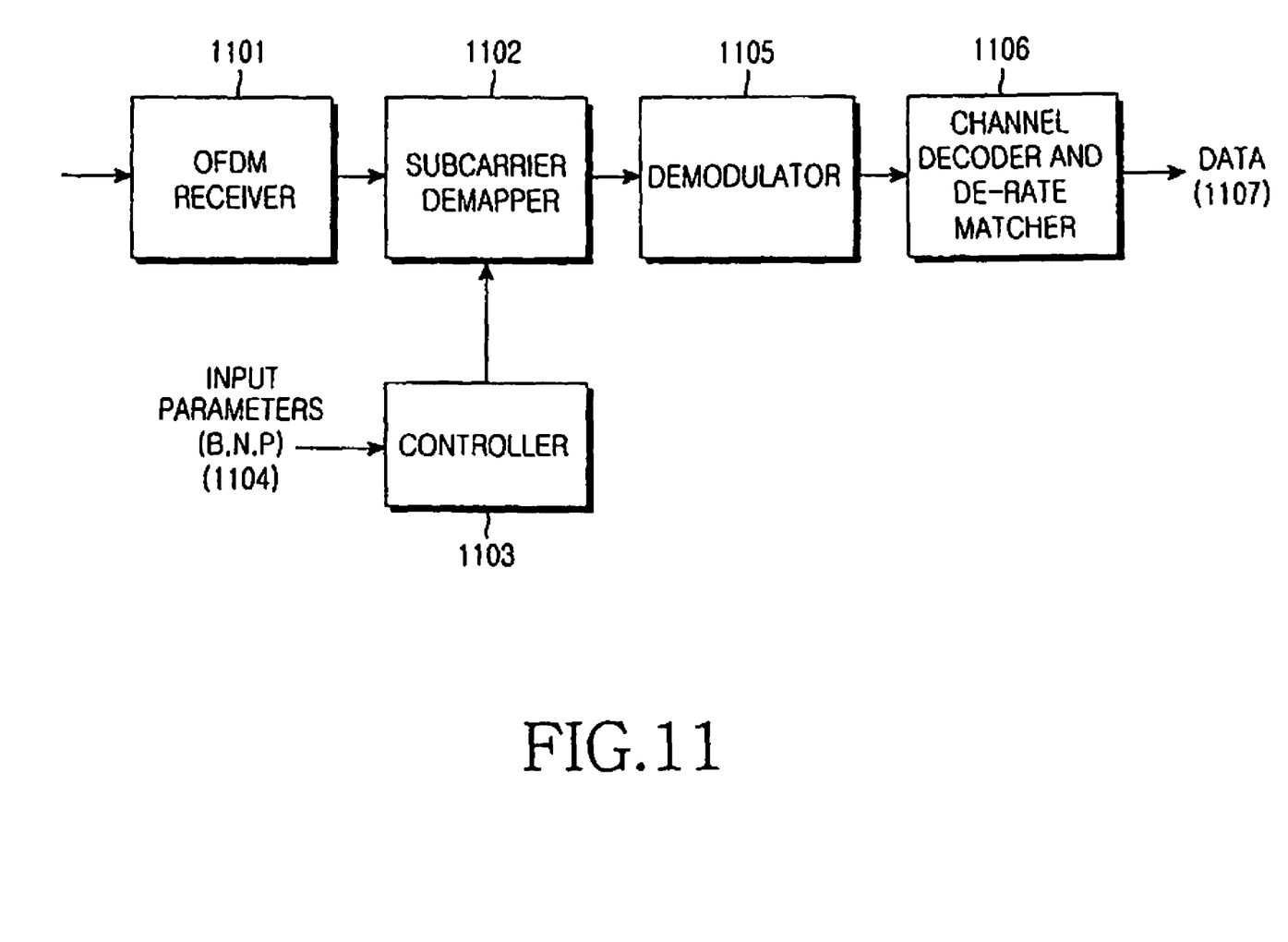
FIG. 11 illustrates a receiver according to the present invention.

FIG. 11 illustrates a receiver according to the present invention.

Referring to FIG. 11, a conventional OFDM receiver 1101, which includes a CP remover (not shown) and an Inverse fast Fourier Transform (IFFT) processor (not shown), receives an OFDM signal from the transmitter. A subcarrier demapper 1102 extracts modulation symbols from subcarriers that carry data.

A controller 1103 controls the operation of the subcarrier demapper 1102 in the method illustrated in FIGS. 6, 7 and 8. For computing Equation (1), the controller 1103 receives B, P and D. A demodulator 1005 demodulates the modulation symbols such as QPSK or 16QAM symbols, thus producing code symbols. A channel decoder and de-rate matcher 1006 de-rate matches the code symbols and channel-decodes the de-rate matched symbols in a scheme, thereby recovering data.

As is apparent from the above description, since physical channels of different lengths are configured and indexed by use of a channel node tree in an OFDMA wireless communication system, the present invention facilitates agreement on resources used for each physical channel between a transmitter and a receiver, i.e. on subcarriers used to configure each physical channel. Therefore, efficient scheduling and resource utilization are enabled.

Since a DRCH is multiplexed with a BRCH in a frame in the manner that reduces resource allocation indication overhead, resource allocation is efficient.

Resource allocation is further efficient since a DRCH is multiplexed with a BRCH in a frame in the manner that reduces uplink ACK/NACK resource requirements.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for configuring a channel in an Orthogonal Frequency Division Multiple Access (OFDMA) wireless communication system, comprising:
    configuring as many diversity channel first sets as the number of diversity channels available for a frame in a third set, selecting as many Adaptive Modulation and Coding (AMC) channels as the number of diversity channels from among AMC channels available for the frame, and configuring an AMC channel second set in the third set by mapping the selected AMC channels to unselected AMC channels; and
    configuring upper sets using the third set including the diversity channel first set and the AMC channel second set,
    wherein indexes of the selected AMC channels are determined by dividing the number of the AMC channels available for the frame by the number of the selected AMC channels, multiplying a result from the division respectively by 0 and integers less than the number of the selected AMC channels, and selecting minimum integers greater than or equal to integers from the results of the multiplication. and binding the selected AMC channels to AMC channels adjacent to the selected AMC channels.

2. The method of claim 1, further comprising:
allocating the channel including the upper sets and the third set to a receiver.

3. The method of claim 1, wherein the upper sets configuration further comprises:
configuring the upper sets by connecting a diversity channel first set to another diversity channel first set and connecting an AMC channel second set to another AMC channel second set.

4. A method of configuring a channel in an Orthogonal Frequency Division Multiple Access (OFDMA) wireless communication system, comprising:
selecting Adaptive Modulation and Coding (AMC) channels;
dividing the number of the AMC channels available for a frame by the number of the selected AMC channels;
multiplying a result from the division respectively by 0 and integers less than the number of the selected AMC channels; and
selecting minimum integers greater than or equal to integers from the results of the multiplication; and
configuring a channel using a third set including a diversity channel first set and an AMC channel second set, and transmitting the channel to a receiver.

5. An apparatus for configuring a channel in an Orthogonal Frequency Division Multiple Access (OFDMA) wireless communication system, comprising:
a channel encoder and a rate matcher for channel-encoding transmission data and rate-matching the channel-encoded data;
a modulator for modulating the rate-matched data received from the channel encoder and the rate matcher in a modulation scheme;
a subcarrier mapper for mapping modulation symbols received from the modulator to subcarriers in a rule;
an Orthogonal Frequency Division Multiplexing (OFDM) signal generator for generating an OFDM symbol using the mapped modulation symbols; and
a controller for, during the subcarrier mapping, configuring as many diversity channel first sets as the number of diversity channels available for a frame in a third set, selecting as many Adaptive Modulation and Coding (AMC) channels as the number of diversity channels from among AMC channels available for the frame, configuring an AMC channel second set in the third set by mapping the selected AMC channels to unselected AMC channels, and configuring upper sets using the third set including the diversity channel first set and the AMC channel second set,
wherein indexes of the selected AMC channels are determined by dividing the number of the AMC channels available for the frame by the number of the selected AMC channels, multiplying a result from the division respectively by 0 and integers less than the number of the selected AMC channels, and selecting minimum integers greater than or equal to integers from the results of the multiplication, and binding the selected AMC channels to AMC channels adjacent to the selected AMC channels.

6. The apparatus of claim 5, wherein the controller allocates a channel including the third set and the upper sets to a Mobile Station (MS).

7. The apparatus of claim 5, wherein the controller configures the upper sets by connecting a diversity channel first set to another diversity channel first set and connecting an AMC channel second set to another AMC channel second set.

8. An apparatus for configuring a channel in an Orthogonal Frequency Division Multiple Access (OFDMA) wireless communication system , comprising:
a controller for selecting Adaptive Modulation and Coding (AMC) channels,
dividing the number of the AMC channels available for a frame by the number of the selected AMC channels, multiplying a result from the division respectively by 0 and integers less than the number of the selected AMC channels, and selecting minimum integers greater than or equal to integers from the results of the multiplication, and
configuring the channel using a third set including a diversity channel first set and an AMC channel second set, and transmitting the channel to a receiver.

9. A method for receiving a channel in an Orthogonal Frequency Division Multiple Access (OFDMA) wireless communication system, comprising:
receiving an Orthogonal Frequency Division Multiplexing (OFDM) signal from a transmitter;
extracting modulation symbols from the OFDM signal;
converting the modulation symbols to code symbols;
de-rate matching the code symbols and channel-decoding the de-rate matched symbols,
wherein during the extraction of the modulation symbols, a third set including a diversity channel first set and an Adaptive Modulation and Coding (AMC) channel second set are extracted, the diversity channel first set being configured in the third set for as many diversity channels available for a frame, and the AMC channel second set being configured by selecting as many AMC channels as the number of diversity channels from among AMC channels available for the frame and mapping the selected AMC channels to unselected AMC channels,
wherein indexes of the selected AMC channels are determined by dividing the number of the AMC channels available for the frame by the number of the selected AMC channels, multiplying a result from the division respectively by 0 and integers less than the number of the selected AMC channels, and selecting minimum integers greater than or equal to integers from the results of the multiplication, and binding the selected AMC channels to AMC channels adjacent to the selected AMC channels.

10. An apparatus for receiving a channel in an Orthogonal Frequency Division Multiple Access (OFDMA) wireless communication system, comprising:
an Orthogonal Frequency Division Multiplexing (OFDM) receiver for receiving an OFDM signal from a transmitter;
a subcarrier demapper for extracting modulation symbols from the OFDM signal;
a demodulator for converting the modulation symbols to code symbols;
a de-rate matcher and a channel decoder for de-rate matching the code symbols and channel-decoding the de-rate matched symbols; and
a controller for, during the extraction of the modulation symbols, extracting a third set including a diversity channel first set and an Adaptive Modulation and Coding (AMC) channel second set, the diversity channel first set being configured in the third set for as many diversity channels available for a frame, and the AMC channel second set being configured by selecting as many AMC channels as the number of diversity channels from among AMC channels available for the frame and mapping the selected AMC channels to unselected AMC channels, wherein indexes of the selected AMC channels are determined by dividing the number of the AMC channels available for the frame by the number of the selected AMC channels, multiplying a result from the division respectively by 0 and integers less than the number of the selected AMC channels, and selecting minimum integers greater than or equal to integers from the results of the multiplication, and binding the selected AMC channels to AMC channels adjacent to the selected AMC channels.

\* \* \* \* \*

UNITED STATES PATENT AND TRADEMARK OFFICE
CERTIFICATE OF CORRECTION

| | | |
|---|---|---|
| PATENT NO. | : 8,098,596 B2 | Page 1 of 1 |
| APPLICATION NO. | : 11/923312 | |
| DATED | : January 17, 2012 | |
| INVENTOR(S) | : Hwan-Joon Kwon et al. | |

It is certified that error appears in the above-identified patent and that said Letters Patent is hereby corrected as shown below:

In the Claims

In Claim 1, at column 9, line 1, change the "." appearing immediately after the word multiplication to a --,--.

Signed and Sealed this
Seventh Day of April, 2015

Michelle K. Lee
*Director of the United States Patent and Trademark Office*